United States Patent [19]

Wildeman

[11] Patent Number: 5,778,128
[45] Date of Patent: Jul. 7, 1998

[54] SYMMETRIC, DISPERSION-MANAGED FIBER OPTIC CABLE AND SYSTEM

[75] Inventor: George F. Wildeman, Chardon, Ohio

[73] Assignee: Corning Incorporated, Corning, N.Y.

[21] Appl. No.: 799,652

[22] Filed: Feb. 11, 1997

Related U.S. Application Data

[60] Provisional application No. 60/011,838 Feb. 16, 1996.
[51] Int. Cl.$^6$ ............... G02B 6/02
[52] U.S. Cl. ............... 385/123; 359/124
[58] Field of Search ............... 356/73.1, 350; 385/123, 122, 11, 24, 124, 141; 359/161, 173, 124, 900, 333

[56] References Cited

U.S. PATENT DOCUMENTS

| | | | |
|---|---|---|---|
| 4,300,930 | 11/1981 | Chang | 385/123 |
| 4,733,940 | 3/1988 | Broer et al. | 385/123 |
| 4,889,404 | 12/1989 | Bhagavatula | 359/124 |
| 4,969,710 | 11/1990 | Tick et al. | 385/123 |
| 5,361,319 | 11/1994 | Antos et al. | 385/123 |
| 5,448,674 | 9/1995 | Vengsarkar et al. | 385/123 |
| 5,602,666 | 2/1997 | Ishikawa et al. | 359/161 |
| 5,606,445 | 2/1997 | Kikuchi et al. | 359/161 |
| 5,636,046 | 6/1997 | Ishikawa et al. | 385/123 |
| 5,696,614 | 12/1997 | Ishikawa et al. | 359/124 |
| 5,724,125 | 3/1998 | Nishi et al. | 356/73.1 |
| 5,724,126 | 3/1998 | Nishi et al. | 356/73.1 |

*Primary Examiner*—Akm E. Ullah
*Attorney, Agent, or Firm*—William J. Chervenak

[57] ABSTRACT

A symmetric, dispersion-managed fiber optic cable in accordance with the present invention includes a first and a second optical fiber. The first optical fiber is a conventional single mode fiber (SMF) type fiber and has a first effective area and a positive dispersion characteristic at a predetermined operating wavelength range. The first optical fiber is split into two segments each having substantially the same length. The second optical fiber has a second effective area and a negative dispersion characteristic at the operating wavelength range. Typically, second optical fiber is a DSF or an NZD fiber, both with negative dispersion and a small effective area. The second optical fiber is coupled between the two segments of the first fiber to create a fiber optic cable with an average total dispersion at the operating wavelength range which is substantially zero. The fiber optic cable may be incorporated into an optical fiber transmission system with an optical terminal and at least one repeater.

10 Claims, 1 Drawing Sheet

SYMMETRIC, DISPERSION-MANAGED FIBER OPTIC CABLE AND SYSTEM

This is a provisional application of 60/011,838 filed on Feb. 16, 1996.

FIELD OF THE INVENTION

This invention relates generally to a fiber optic cable and, more particularly, to a symmetric, dispersion-managed fiber optic cable and system.

BACKGROUND OF THE INVENTION

Lightwave signals transmitted through optical fibers are subject to various distorting and attenuating non-linear effects that limit their practical transmission distance. Typically, optical fibers are employed in fiber optic systems that consists of an optical terminal and a plurality of amplifiers/repeaters connected by optical fibers. Amplifier/repeaters, which are typically situated at regular intervals along a transmission path, serve to boost the strength of the signal pulses, thereby overcoming the effects of attenuation. The total length of the transmission path is limited by phase shifts in the pulsed signals resulting from the optical non-linearity of the optical fibers.

The magnitude of the nonlinear effects on signal transmission is affected by various characteristics of the optical fibers. One such characteristic is the "effective cross-sectional area" or simply "effective area" of a fiber. For an optical signal of a given power density, the larger the effective area, the further the signal can be propagated through the fiber without substantial loss. Thus, use of a fiber having a large effective area makes possible a lengthening of the span of optical fiber between amplifier/repeaters and of the total transmission system as well.

Another important characteristic of an optical fiber that affects signal transmission is its dispersion. Nonlinear effects that are especially sensitive to fiber dispersion include parametric processes such as self-phase modulation, cross-phase modulation, and four-photon mixing. Fiber dispersion causes frequency spreading of the pulsed signal along the transmission path, an effect that is cumulative and requires filtration of the signal before its entrance into a receiver. Even with filtration, the broadening of the received signal worsens the signal-to-noise ratio and leads to increased signal errors. It is thus desirable to have a dispersion characteristic near zero at the operating wavelength range of the optical transmission system. One convenient range of operating wavelengths for long-range transmission systems is between 1530 nm and 1560 nm.

Certain commercially available optical fibers, known as dispersion-shifted fibers (DSF), exhibit zero-dispersion behavior near certain convenient operating wavelengths, for example, near 1550 nm. However, these fibers typically have small effective areas, requiring the placement of boosters at relatively close intervals in a transmission system. Another type of commercially available fiber, known as non-zero dispersion fiber (NZD), also has a small effective areas and exhibits very low, but non-zero dispersion, near 1550 nm. Other commercially available optical fibers, such as conventional single-mode (SMF) fibers, have large effective areas and exhibit very high dispersions near 1550 nm. Thus, the desirable properties of large effective area and zero-dispersion close to a particular convenient operating wavelength range are generally not both to be found in a single commercially available optical fiber.

A "dispersion managed" optical fiber system may be defined as one comprising an optical fiber having positive dispersion characteristics together with an optical fiber having negative dispersion characteristics, wherein the total dispersion of the system is close to zero. For example, Kurtzke, Christian "Suppression of Fiber Nonlinearities by Appropriate Dispersion Management," *IEEE Photonics Technology Letters*, 1993, Vol. 5, pp 1250–1253, the disclosure of which is incorporated herein by reference, proposes a configuration using alternating segments of optical fibers with relatively high chromatic dispersion, one positive and the other negative. Chraplyvy et al., "8×10 Gb/s Transmission Through 280 km of Dispersion Managed Fiber," ibid, pp 1233–1235, the disclosure of which is incorporated herein by reference, describes a transmitting system having an average dispersion near zero in which each span consists of a relatively short length of a conventional fiber with a dispersion of 16 ps/nm/km and a longer length of a dispersion-shifted fiber having dispersion equal to −2.5 ps/nm/km.

Henmi et al., "An Arrangement of Transmission-Fiber Dispersions for Increasing the Spacing Between Optical Amplifiers in Lumped Repeater Systems," ibid., pp 1337–1340, the disclosure of which is incorporated herein by reference, proposes a method for suppressing nonuniformities in transmission systems that utilizes a fiber having a dispersion of about −0.2 ps/nm/km at 1.548 µm, to which is connected a short length of a 1.3 µm zero-dispersion fiber, the total dispersion of the span being about zero. A similar approach is described in Henmi et al., "A New Design Arrangement of Transmission Fiber Dispersion for Suppressing Nonlinear Degradation in Long-Distance Optical Transmission Systems with Optical Repeater Amplifiers," *Journal of Lightwave Technology*, 1993, Vol. 11, pp 1615–1621, the disclosure of which is incorporated herein by reference.

Rosenberg, U.S. Pat. No. 5,191,631, the disclosure of which is incorporated herein by reference, describes a hybrid optical fiber comprising a first optical fiber coupled to a second fiber, where the first optical fiber has an effective area substantially larger and a dispersion characteristic substantially lower at a predetermined operating wavelength range than the corresponding properties of the second optical fiber. The first optical fiber with the larger effective area and positive dispersion characteristics is placed after the terminal or repeater and before the second optical fiber with the smaller effective area and negative dispersion characteristics to reduce the effects of non-linearities over a longer distance.

Referring to FIG. 1, an example of a prior art optical fiber transmission system 100 is shown. System 100 includes an optical terminal 110 and repeaters 120, also known as "amplifier/repeaters". Terminal 110 and repeater 120 are connected by two asymmetric fiber optic cables 150 and 160. Asymmetric fiber optic cable 150 is used for transmission from terminal 110 to repeater 120 and fiber optic cable 160 is used for transmission from repeater 120 to terminal 110. Each asymmetric fiber optic cable 150 and 160 consists of a relatively short segment 130 of a fiber having a positive dispersion (+D) and a large effective area connected to a longer segment 140 of a fiber having a negative dispersion (−D) and a smaller effective area. The segment 130 with the larger effective area is situated upstream, i.e., nearer the terminal 110 or repeater 120, to reduce the effects of the non-linearities over a longer distance. Since a segment with a large effective area is needed near the terminal 110 or repeater 120 which is transmitting, then two asymmetric fiber optic cable 150 and 160 are needed between terminal 110 and repeater 120 for transmission in each direction. The duplication in asymmetric fiber optic cables 150 and 160 between terminal 110 and repeater 120 and between repeaters 120 adds significantly to the initial construction cost of and ongoing maintenance of system 100.

SUMMARY OF THE INVENTION

A symmetric, dispersion-managed fiber optic cable in accordance with the present invention includes a first and a second optical fiber. The first optical fiber is a conventional single mode fiber (SMF) type fiber and has a first effective area and a positive dispersion characteristic at a predetermined operating wavelength range. The first optical fiber is split into two segments each having substantially the same length. The second optical fiber has a second effective area and a negative dispersion characteristic at the operating wavelength range. Typically, second optical fiber is a DSF or an NZD fiber, both with negative dispersion and a small effective area. The second optical fiber is coupled between the two segments of the first fiber to create a fiber optic cable with an average total dispersion at the operating wavelength range which is substantially zero. The fiber optic cable may be incorporated into an optical fiber transmission system with an optical terminal and at least one repeater.

The symmetric, dispersion-managed fiber optic cable in accordance with the present invention provides several advantages. The symmetric, dispersion-managed fiber optic cable is easier to manufacture then prior cables because it does not require the complicated construction of any special type of asymmetric fiber optic cable which has separate optical fibers for transmission in opposing directions. The symmetric, dispersion-managed fiber optic cable is also more inexpensive to manufacture and maintain then prior cables because it uses optical fibers which are readily available and because it's simpler design reduces the amount of optical fiber needed. The simpler design for the symmetric, dispersion-managed fiber optic cable also makes it easier to design fiber optic systems. Although the symmetric, dispersion-managed fiber optic cable has a simpler design then prior cables, it still is able to reduce non-linear effects because it still provides a segment of an optical fiber with a large effective area after each repeater or terminal which is transmitting an optical signal.

DETAILED DESCRIPTION OF THE INVENTION

Figure 1:
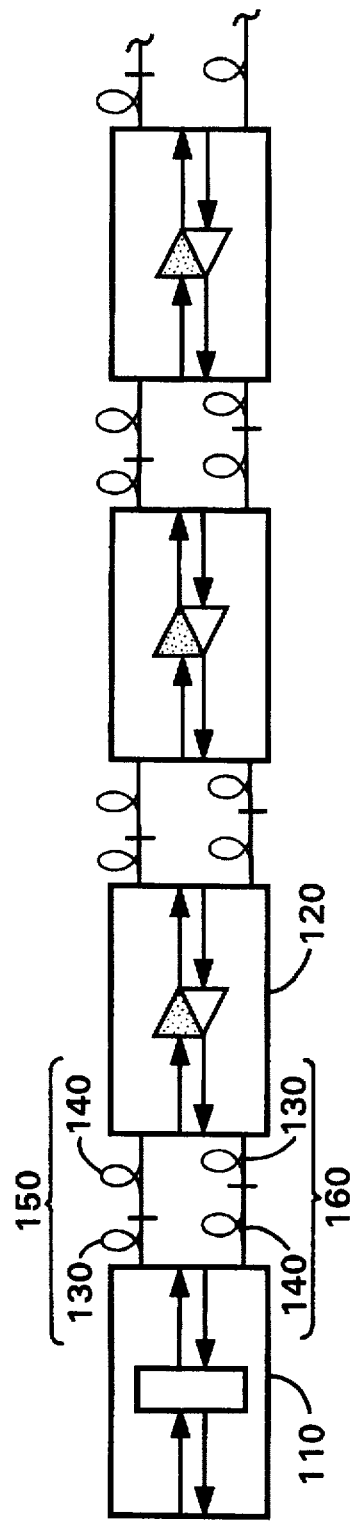
FIG. 1 is a block diagram of a prior art optical fiber transmission system consisting of an asymmetric arrangement of fiber optic cables.
Figure 2:
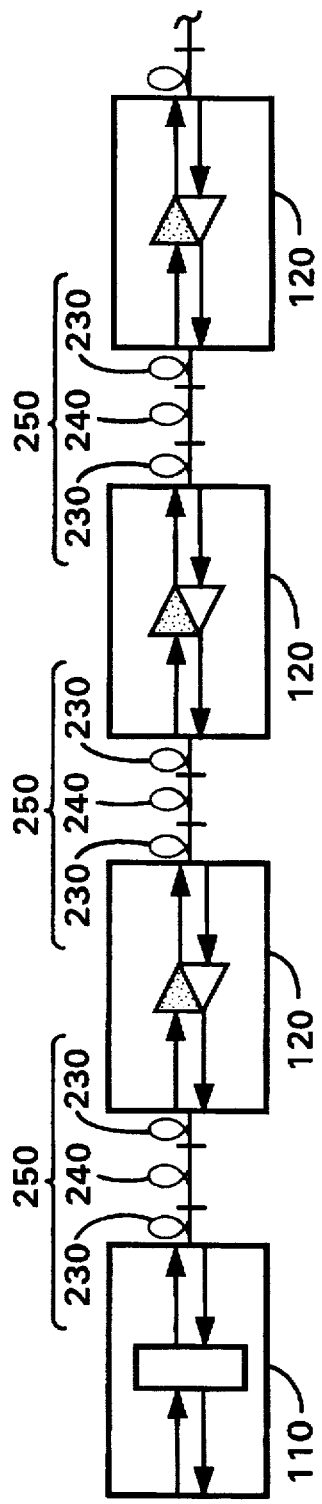
FIG 2 is a block diagram of an optical fiber transmission system with a plurality of symmetric, dispersion-managed fiber optic cables in accordance with the present invention.

Referring to FIG. 2, a block diagram of an optical fiber transmission system 200 in accordance with the present invention is illustrated. System 200 includes an optical terminal 110, repeaters 120 also referred to as "amplifier/repeaters", and symmetric, dispersion-managed fiber optic cables 250. Symmetric, dispersion-managed fiber optic cable 250 simplifies the initial construction and ongoing maintenance of system 200 by eliminating the need for an arrangement of asymmetric fiber optic cables for each direction between a terminal 110 and a repeater 120 or between repeaters 120 as shown in FIG. 1. Symmetric, dispersion-managed fiber optic cable 250 is also more inexpensive to manufacture and maintain then prior cables because it uses optical fibers which are readily available and because it's simpler design reduces the amount of optical fiber needed. Although symmetric, dispersion-managed fiber optic cable 250 has a simpler design then prior cables, it still is able to reduce non-linear effects because it still provides a segment 230 of a first optical fiber with a large effective area after each repeater 120 or terminal 110 which is transmitting an optical signal.

Referring more specifically to FIG. 2, terminal 110 generates optical signals for transmission in system 200 in a manner well known to those skilled in the art. Terminal 110 may also operate as a receiver to receive optical signals from a repeater 120. Repeaters 120 receive transmitted optical signals and then amplify, filter, and retransmit the optical signals also in a manner well known to those skilled in the art. Symmetric, dispersion-managed fiber optic cable 250 couples terminal 110 to repeater 120 and couples subsequent pairs of repeaters 120 together.

Symmetric, dispersion-managed fiber optic cable 250 also known as "a span of cable" comprises a first optical fiber which comprises two segments 230 and a second optical fiber 240. The first optical fiber comprising two segments 230 has a large effective area and a positive dispersion (+D) and is preferably a conventional SMF type fiber. In this particular embodiment, the first optical fiber has an effective area of about 70 to 90 $\mu m^2$ and a dispersion characteristic of about 15 to 20 ps/nm/km at an operating wavelength range of about 1530 to 1560 nm, although an optical fiber with a different effective area and different dispersion characteristics could be used.

Second optical fiber 240 is typically a DSF with negative dispersion (−D) or an NZD fiber with negative dispersion, both with a small effective area. In this particular embodiment, second optical fiber 240 has a dispersion characteristic of about −0.1 to −6.0 ps/nm/km at an operating wavelength range of about 1530 to 1560 nm and an effective area of about 45 to 55 $\mu m^2$, although an optical fiber with a different effective area and different dispersion characteristics could be used.

Symmetric, dispersion-managed fiber optic cable 250 is created by coupling one segment 230 of first optical fiber to each end of second optical fiber 240. Symmetric, dispersion-managed fiber optic cable 250 is created so that the total average dispersion of symmetric, dispersion-managed fiber optic cable 250 at the operating wavelength range is at a desired average total dispersion value. In this particular embodiment, the desired average total dispersion value is near zero at the operating wavelength range, although other values could be selected if desired.

To create the symmetric, dispersion-managed fiber optic cable 250, the total length of each segment 230 of first optical fiber and second optical fiber 240 are selected so that the total average dispersion of the symmetric, dispersion-managed fiber optic cable 250 is at a desired average total dispersion value at the operating wavelength range. The lengths of segments 230 of first optical fiber and for second optical fiber 240 are determined based upon the ratio of the magnitudes of the dispersion characteristics for segments 230 of first optical fiber and for second optical fiber 240. Other factors, such as the type of terminal 110 and repeaters 120 used in system 200, may also be considered in determining the appropriate length for segments 230 of first optical fiber and second optical fiber 240.

In this particular embodiment, two segments 230 of first optical fiber are each substantially the same length and have a combined length which is substantially less than the length of second optical fiber 240, although the combined lengths of segments 230 could be the same or greater than -second optical fiber 240 depending upon the particular dispersion characteristics of segments 230 of first optical fiber and second optical fiber 240. Additionally, in this particular embodiment, the ratio of the length of either segment 230 of the first optical fiber to the length of second optical fiber 240 is from about 1:10 to 1:25, although the ratio can also vary as needed and desired. Further, in this particular embodiment, the length of cable 250 coupling either terminal 110 to repeater 120 or repeater 120 to another repeater 120 is between about 60 to 140 km, although the total length of cable 250 can also vary as needed and desired.

The symmetrical construction of fiber optic cable 250 significantly simplifies the asymmetrical arrangement of optical fibers for transmission in each direction between a terminal 110 and a repeater 120 or between repeaters 120 as shown in FIG. 1 because the symmetric, dispersion-managed fiber optic cable can handle transmissions with equal efficiency in either direction. The simplified design for symmetric, dispersion-managed fiber optic cable 250 reduces the manufacturing costs and ongoing maintenance costs over prior cables because cable 250 uses readily available optical fibers, such as conventional SMF and DSF or NZD fibers, and uses less optical fiber because separate optical fiber arrangements in each direction are unnecessary. Although symmetric, dispersion-managed fiber optic cable 250 is a simpler design, cable 250 is still able to minimize non-linearities for transmissions in either direction because an optical signal being transmitted in either direction will always see a segment 230 of first optical fiber with a large effective area first. The large effective area helps to reduce non-linearities.

For purposes of illustration only, an examples of a system with symmetric, dispersion-managed fiber optic cable 250 is set forth below:

EXAMPLE

Dispersion in a System with Symmetric, Dispersion-Managed Fiber Optic Cables and with an Operating Wavelength of 1545 nm A system 200 with symmetric fiber optic cables 250 was modeled for an operating wavelength of 1545 nm and with terminal 110 and repeater 120, as well as pairs of repeaters 120, spaced at 120 km intervals. In this modeling, Corning's SMF-LS® NZD fiber which typically has an effective area of 55 µm² and typically has a dispersion of −1.49 ps/nm/km at 1545 nm is used for second optical fiber 240 and Corning's SMF-28® fiber which typically has an effective area of 80 µm² and typically has a dispersion of 16.63 ps/nm/km at 1545 nm is used for segments 230 of first optical fiber. With the above dispersion characteristics and with the distance between terminal 110 and repeater 120, as well as pairs of repeaters 120, known, the combined length of segments 230 is about 9.9 km (each segment 230 is about 4.9 km) and the length of second optical fiber 240 is about 110.1 km. As shown in Table 1 below, at the operating wavelength of 1545 nm the total dispersion modeled from terminal 110 to repeater 120 and from repeater 120 to repeater 120 always remains substantially zero:

TABLE 1

| Equipment | Fiber Type | Fiber Distance (km) | Cumulative Distance (km) | Cumulative Dispersion (ps/nm/km) |
|---|---|---|---|---|
| Terminal | SMF | 3.3 | 3.3 | 54.9 |
| | NZD | 14.7 | 18.0 | 33.0 |
| | NZD | 14.7 | 32.7 | 11.1 |
| | NZD | 14.7 | 47.3 | −10.7 |
| | NZD | 14.7 | 62.0 | −32.6 |
| | NZD | 14.7 | 76.7 | −54.5 |
| | SMF | 3.3 | 80.0 | 0.4 |
| Repeater | SMF | 3.3 | 83.3 | 55.3 |
| | NZD | 14.7 | 98.0 | 33.4 |
| | NZD | 14.7 | 112.7 | 11.5 |
| | NZD | 14.7 | 127.3 | −10.3 |
| | NZD | 14.7 | 142.0 | −32.2 |
| | NZD | 14.7 | 156.7 | −54.1 |
| | SMF | 3.3 | 160.0 | 0.8 |
| Repeater | SMF | 3.3 | 163.3 | 55.7 |
| | NZD | 14.7 | 178.0 | 33.8 |
| | NZD | 14.7 | 192.7 | 11.9 |
| | NZD | 14.7 | 207.3 | −10.0 |
| | NZD | 14.7 | 222.0 | −31.8 |
| | NZD | 14.7 | 236.7 | −53.7 |
| | SMF | 3.3 | 240.0 | 1.2 |
| Repeater | SMF | 3.3 | 243.3 | 56.1 |
| | NZD | 14.7 | 258.0 | 34.2 |
| | NZD | 14.7 | 272.7 | 12.3 |
| | NZD | 14.7 | 287.3 | −9.6 |
| | NZD | 14.7 | 302.0 | −31.4 |
| | NZD | 14.7 | 316.7 | −53.3 |
| | SMF | 3.3 | 320.0 | 1.6 |

Accordingly, the data in Table 1 provides an example that effective dispersion management can be achieved with a symmetric, dispersion-managed fiber optic cable 250 in accordance with the present invention.

The invention has been described in detail for the purpose of illustration, but it is understood that such detail is solely for that purpose, and variations can be made therein by those skilled in the art without departing from the spirit and scope of the invention, which is defined by the following claims.

What is claimed is:

1. A symmetric, dispersion-managed fiber optic cable comprising:

a conventional single mode fiber having a first effective area and a positive dispersion characteristic at a predetermined operating wavelength range, said conventional single mode fiber comprising two segments each having substantially the same length; and a second optical fiber having a second effective area and a negative dispersion characteristic at the operating wavelength range, said second optical fiber coupled between the two segments of said first fiber, wherein an average total dispersion of the symmetric, dispersion-managed fiber optic cable at the operating wavelength range is a first average total dispersion value.

2. The symmetric, dispersion-managed fiber optic cable according to claim 1, wherein said first average total dispersion value is substantially zero.

3. The symmetric, dispersion-managed fiber optic cable according to claim 1, wherein said second optical fiber has a length substantially greater than the length of either of the two segments of said conventional single mode fiber.

4. The symmetric, dispersion-managed fiber optic cable according to claim 3 wherein the ratio of the length of either segment of said conventional single mode fiber to the length of the said second optical fiber is from about 1:10 to 1:25.

5. The symmetric, dispersion-managed fiber optic cable according to claim 1 wherein the two segments of said conventional single mode fiber and said second optical fiber have a total length of about 60 to 140 km.

6. The symmetric, dispersion-managed fiber optic cable according to claim 1 wherein said conventional single mode fiber has an effective area of about 70 to 90 $\mu m^2$.

7. The symmetric, dispersion-managed fiber optic cable according to claim 1 wherein said conventional single mode fiber has a dispersion characteristic of about 15 to 20 ps/nm/km at an operating wavelength range of about 1530 to 1560 nm.

8. The symmetric, dispersion-managed fiber optic cable according to claim 1 wherein said second optical fiber has an effective area of about 45 to 55 $\mu m^2$.

9. The symmetric, dispersion-managed fiber optic cable according to claim 1 wherein said second optical fiber has a dispersion characteristic of about −0.1 to −6.0 ps/nm/km at an operating wavelength range of about 1530 to 1560 nm.

10. The symmetric, dispersion-managed fiber optic cable according to claim 1 wherein said second optical fiber is a dispersion shifted fiber or a non-zero dispersion fiber.

* * * * *